United States Patent
Hawkins

(10) Patent No.: US 9,558,476 B2
(45) Date of Patent: Jan. 31, 2017

(54) METHOD AND DEVICE FOR EDITING WORKSPACE DATA OBJECTS

(75) Inventor: Siavash James Joorabchian Hawkins, London (GB)

(73) Assignee: Good Technology Holdings Limited, Waterloo, Ontario (CA)

(*) Notice: Subject to any disclaimer, the term of this patent is extended or adjusted under 35 U.S.C. 154(b) by 323 days.

(21) Appl. No.: 12/829,157

(22) Filed: Jul. 1, 2010

(65) Prior Publication Data

US 2012/0005578 A1 Jan. 5, 2012

(51) Int. Cl.
| | |
|---|---|
| G06F 3/0488 | (2013.01) |
| G06Q 10/10 | (2012.01) |
| G06F 21/31 | (2013.01) |
| G06F 21/62 | (2013.01) |
| H04M 1/725 | (2006.01) |

(52) U.S. Cl.
CPC ......... *G06Q 10/1093* (2013.01); *G06F 3/0488* (2013.01); *G06F 21/31* (2013.01); *G06F 21/6209* (2013.01); *G06Q 10/107* (2013.01); *G06Q 10/109* (2013.01); *H04M 1/72566* (2013.01); *G06F 2221/2141* (2013.01); *H04M 1/72552* (2013.01); *H04M 2250/22* (2013.01)

(58) Field of Classification Search
CPC .... G06F 3/017; G06F 3/0481; G06F 3/04817; G06F 3/0482; G06F 3/0483; G06F 3/0488; G06F 3/04883; G06F 9/4443; G06F 9/4448; G06F 17/30595; G06F 17/30873; G06F 17/3089; G06F 17/30899; G06F 2203/04803; G01D 7/04; G06Q 10/10; G06Q 10/107; G06Q 10/109; H04L 29/08072; H04L 29/0809; H04L 12/58; H04N 5/44543; H04N 5/44591

USPC ....... 715/702, 765, 810, 206, 738, 779, 792, 715/863; 709/217; 707/206, 769
See application file for complete search history.

(56) References Cited

U.S. PATENT DOCUMENTS

| | | | |
|---|---|---|---|
| 7,730,404 B2 | 6/2010 | May et al. | |
| 7,877,703 B1* | 1/2011 | Fleming | 715/800 |
| 2003/0001895 A1 | 1/2003 | Celik | |
| 2004/0027391 A1* | 2/2004 | Tu | 345/810 |
| 2004/0093568 A1* | 5/2004 | Lerner et al. | 715/541 |
| 2004/0243677 A1 | 12/2004 | Curbow et al. | |
| 2008/0168396 A1* | 7/2008 | Matas et al. | 715/840 |
| 2008/0220748 A1* | 9/2008 | Park | 455/414.1 |

(Continued)

FOREIGN PATENT DOCUMENTS

| | | |
|---|---|---|
| CN | 1885985 | 12/2006 |
| CN | 101383867 A | 3/2009 |

(Continued)

OTHER PUBLICATIONS

Screenshots of Outlook 2010 (released on Jun. 15, 2010).*

(Continued)

*Primary Examiner* — Jeffrey A Gaffin
*Assistant Examiner* — Rinna Yi
(74) *Attorney, Agent, or Firm* — Fish & Richardson P.C.

(57) ABSTRACT

Disclosed herein are methods and devices for associating a first workspace data object with a first workspace service and for determining characteristics of the association of the first workspace data object with the first workspace service. The methods and devices described herein relate to receiving touch-screen based input in a plurality of display areas of a display to make the associations.

21 Claims, 6 Drawing Sheets

(56) References Cited

U.S. PATENT DOCUMENTS

| | | | |
|---|---|---|---|
| 2008/0262714 A1* | 10/2008 | Abramovich Ettinger | ... 701/201 |
| 2009/0068990 A1 | 3/2009 | Kim et al. | |
| 2010/0088654 A1* | 4/2010 | Henhoeffer | ................... 715/863 |
| 2010/0100855 A1 | 4/2010 | Yoo | |
| 2010/0156813 A1* | 6/2010 | Duarte et al. | ................. 345/173 |
| 2010/0279741 A1* | 11/2010 | Park | .............................. 455/566 |

FOREIGN PATENT DOCUMENTS

| | | |
|---|---|---|
| CN | 101533330 A | 9/2009 |
| WO | WO 2007/033465 | 3/2007 |
| WO | WO 2007/121329 | 10/2007 |

OTHER PUBLICATIONS

Apple iPhone (published on Nov. 12, 2007) http://www.solarnavigator.net/sponsorship/telecommunications/apple_iphone.htm.*

Microsoft Office 2010—Wikipedia https://en.wikipedia.org/wiki/Microsoft_Office_2010.*

Scherotter, Michael S.; Creating an Outlook Appointment Based on an Email Message; http://blogs.msdn.com/b/synertist/archive/2007/05/09 . . . ; May 9, 2007.

PCT International Search Report and Written Opinion, dated Nov. 7, 2011 for International Application No. PCT/EP2011/061161.

Office Action issued in Chinese Application No. 201180032841.5 on Jun. 2, 2015.

Office Action issued in Chinese Application No. 201180032841.5 on Apr. 15, 2016.

Office Action issued in Chinese Application No. 201180032841.5 on Aug. 19, 2016.

Communication Pursuant to Article 94(3) EPC issued in European Application No. 11735826.7 on Mar. 18, 2014.

Communication Pursuant to Article 94(3) EPC issued in European Application No. 11735826.7 on Jan. 26, 2015.

Summons to Attend Oral Proceedings Pursuant to Rule 115(1) EPC issued in European Application No. 11735826.7 on Nov. 18, 2015.

Office Action issued in European Application No. 11735826.7 on Sep. 7, 2016.

* cited by examiner

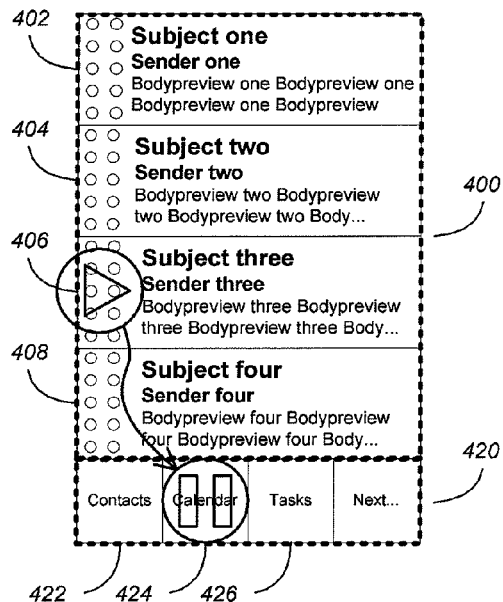
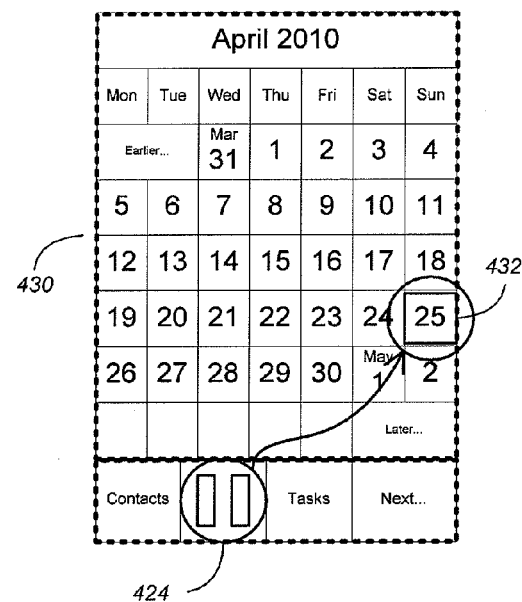
Figure 4a
Figure 4b
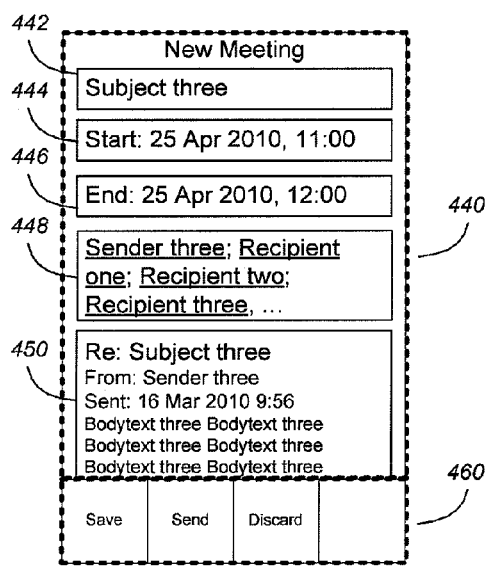
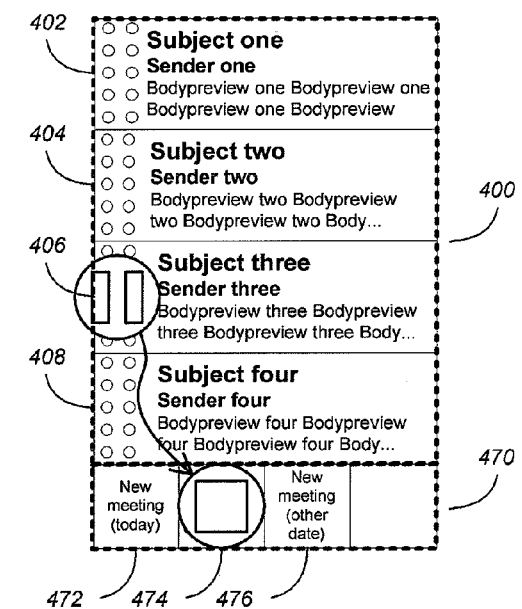
Figure 4c
Figure 4d

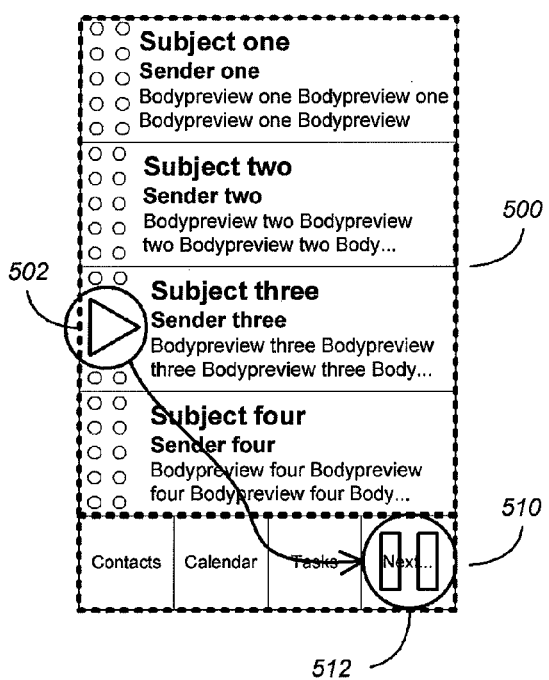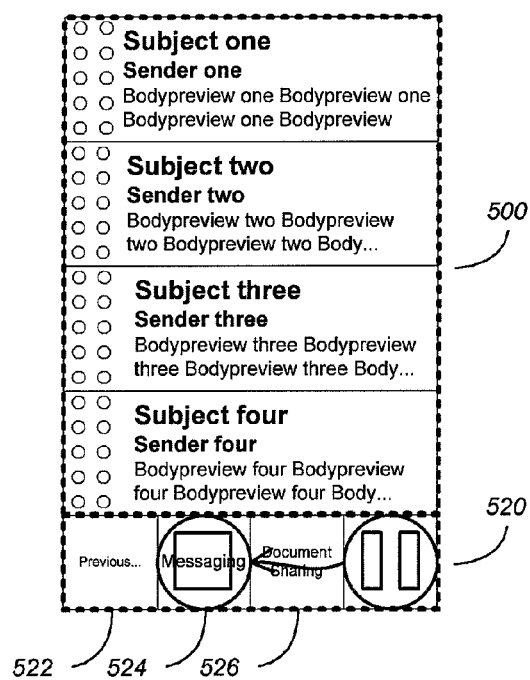
Figure 5a
Figure 5b

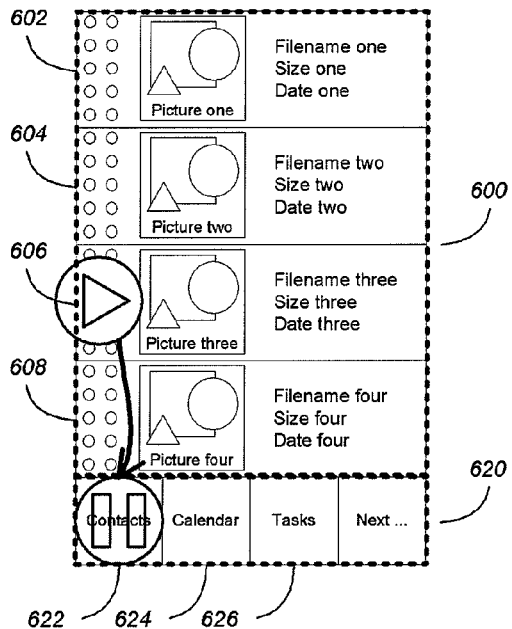
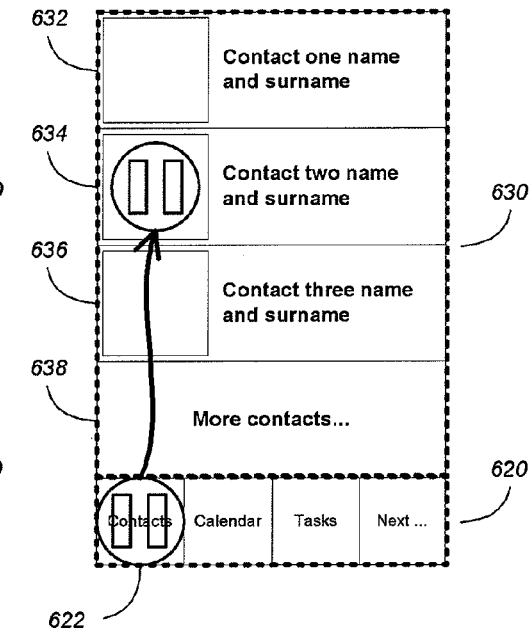
Figure 6a
Figure 6b
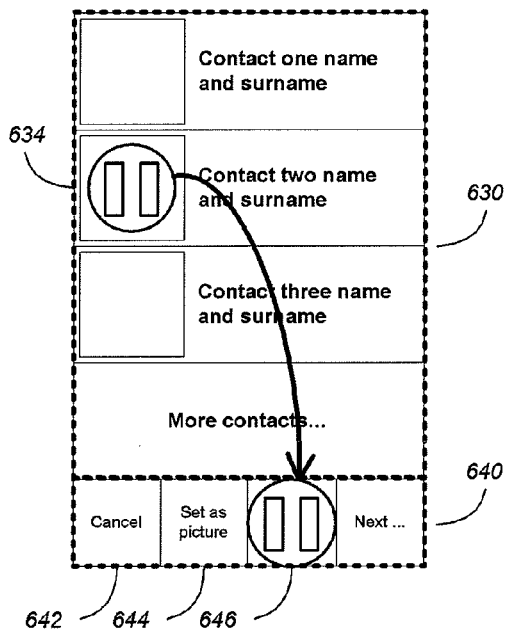
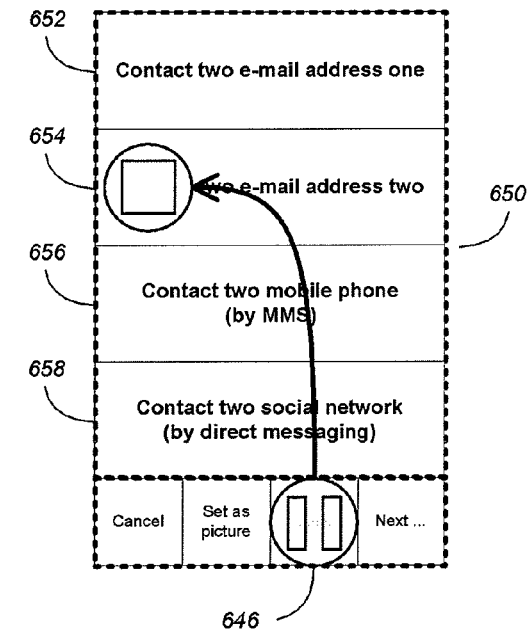
Figure 6c
Figure 6d

METHOD AND DEVICE FOR EDITING WORKSPACE DATA OBJECTS

FIELD OF THE INVENTION

The present invention relates to a method and device configured to provide functions for editing workspace data objects.

BACKGROUND OF THE INVENTION

Methods and devices are known that provide functions for editing workspace data objects which may include emails, documents, contact entries, calendar entries, etc. Some of these devices may be configured to allow the user to enter associations between a first selectable element and a second selectable element by, for example, using an input action to drag and drop the first selectable element onto the second selectable element.

Typically in response to associations entered in this way a default action is performed. However the default action leads to the same result in each case and different characteristics of the association are not provided for. These additional characteristics can be defined by the user entering additional input, which typically involves a relatively large amount of user input. Entering this input can be onerous, particularly on a relatively small touch-screen display such as those which are provided on portable computing devices.

The present invention aims to provide a method and device for associating a first workspace data object with a first workspace service and for determining characteristics of the association of the first workspace data object with the first workspace service. The method and device are particularly suited for use with a relatively small touch-screen display on a portable computing device using relatively little user input.

SUMMARY OF THE INVENTION

In accordance with one aspect of the present invention there is provided a portable computing device comprising a touch-screen display, the device being configured to provide functions for editing workspace data objects, including functions for associating a first workspace data object with a first workspace service and for providing a workspace service editor for editing a second workspace data object, the second workspace data object being populated with at least some data from said first workspace data object according to the association of the first workspace data object with the first workspace service, characteristics of the association of the first workspace data object with the first workspace service being determined by touch-screen user input in a plurality of user interface configurations including: in a first user interface configuration, displaying selectable elements in a plurality of areas of said display, including a first display area in which at least one selectable element is displayed corresponding to a workspace data object and a second display area in which at least one selectable element is displayed for the selection of a workspace service; in a second user interface configuration, displaying at least one new selectable element, the at least one new selectable element being displayed in at least a part of at least one of said first display area and said second display area; in said first user interface configuration, receiving touch-screen user input to determine the at least one new selectable element; and in said second user interface configuration, receiving touch-screen user input to select said one new selectable element and to determine a characteristic of the second workspace data object.

By providing a first user interface configuration and a second user interface configuration each comprising a first display area and a second display area it is possible to display in a limited screen area selectable elements that may be used to input the association of a first workspace data object with a first workspace service.

Alternative methods for entering touch-screen user input in the first and second user interface configurations are provided that offer flexibility to the user when entering touch-screen user input to create an association and determine characteristics of the second workspace data object.

A number of workspace services may be associated with the first workspace object, even if some of those workspace services may not initially be displayed in the workspace service area due to a lack of display space on the touch-screen display device.

A number of different actions based on the association of the first workspace data object and first workspace service may be entered by the user. These actions may allow further characteristics of the second workspace object to be determined from the association of the first workspace object and first workspace service.

Further features and advantages of the invention will become apparent from the following description of preferred embodiments of the invention, given by way of example only, which is made with reference to the accompanying drawings.

BRIEF DESCRIPTION OF THE DRAWINGS

FIG. 1b schematically illustrates the communication links of the portable computing device of FIG. 1a.

FIG. 2 shows an external view of an exemplary embodiment of the portable computing device of FIG. 1a.

FIG. 4a shows an exemplary screen relating to a user interface configuration displayed by an email application of the portable computing device of FIG. 1a.

FIGS. 4b and 4c show exemplary screens relating to a user interface configuration displayed by a calendar application of the portable computing device of FIG. 1a.

FIG. 4d shows an exemplary screen relating to a user interface configuration displayed by an email application of the portable computing device of FIG. 1a.

FIGS. 5a and 5b show exemplary screens relating to a user interface configuration displayed by an email application of the portable computing device of FIG. 1a.

FIG. 6a shows an exemplary screen relating to a user interface configuration displayed by a document manager application of the portable computing device of FIG. 1a.

FIGS. 6b to 6d show exemplary screens relating to a user interface configuration displayed by a contacts application of the portable computing device of FIG. 1a.

DETAILED DESCRIPTION OF THE INVENTION

Figure 1A:
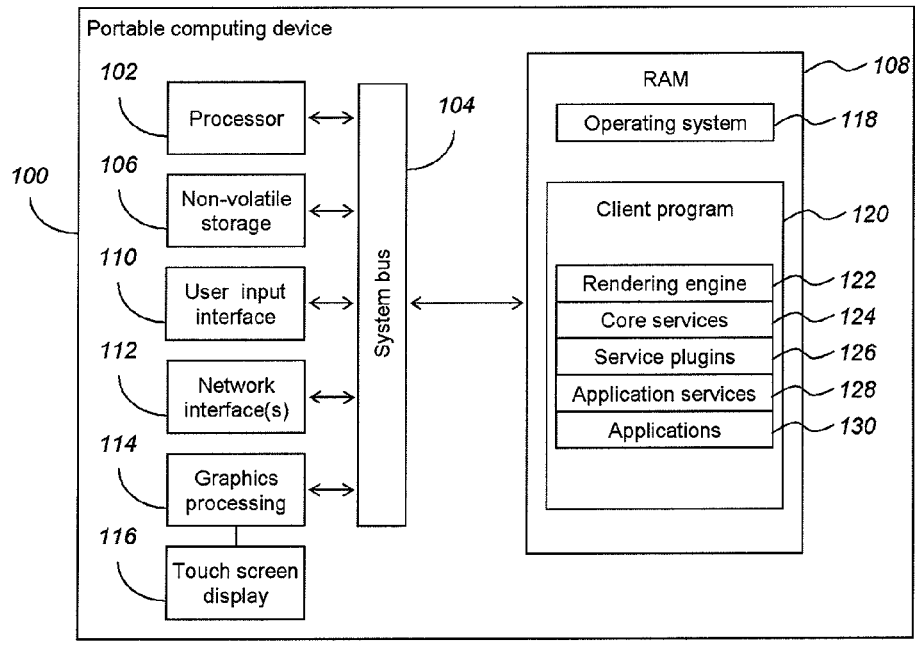
FIG. 1a schematically illustrates the components of a portable computing device in accordance with an embodiment of the invention.

FIG. 1a schematically illustrates the components of a portable computing device 100, which is an exemplary device used to illustrate the features of the present invention.

The portable computing device 100 may take the form of a smartphone, a personal digital assistant (PDA), an e-reader, a tablet computer etc. The portable computing device 100 includes a processor 102 that is able to transmit control messages to, receive status information from, and transmit data to and from components within the portable computing device 100 that are connected to a system bus 104, where these components may include a non-volatile storage device 106, random access memory 108, user input interface 110, network interface 112 and graphics processing component 114. The processor 102, which in this embodiment is a microprocessor, processes instructions stored in the random access memory (RAM) 108 that have been loaded from the non-volatile storage device 106 which could be for example a flash memory or a hard disk drive. These instructions are in the form of computer software in the form of one or more programs that implement an operating system 118 and a client program. The RAM 108 is also used by programs running on the processor 102 as a means of storing and accessing data in the form of electronic signals where the data is used during the execution of the programs.

The operating system 118 is computer software in the form of a program or set of programs whose instructions are loaded from non-volatile storage 106 by the processor 102 and executed when the portable computing device 100 is turned on. The operating system 118 may start further programs automatically and/or may allow a user to start further programs, for example by the user using a user interface provided by the operating system 118. The operating system 118 enables the sharing of the processing power provided by the processor 102 between the programs (e.g. 120) running on the processor 102.

The operating system 118 provides a programmatic interface for programs running on the processor 102 allowing them to request functionality from the operating system 118. This programmatic interface may take the form of procedures, i.e. system calls, which a program running on the processor 102 may use in order to invoke the operating system 118 and request it to provide desired functionality. In response to receiving a request for functionality the operating system 118 may transmit control messages to, receive status information from, transmit data to and/or receive data from components (e.g. 106, 108, 110, 112, 114, 116) connected to the system bus 104 in order to provide the requested functionality, and may also return data to the requesting program as a result.

The operating system 118 may provide a file system for storing, modifying and accessing files held in non-volatile storage 106. This file system may be accessible to other programs running on the processor 102 via the programmatic interface provided by the operating system 118. The operating system 118 may also provide database access procedures for creating, accessing and modifying databases managed by the operating system 118 (e.g. databases held in non-volatile storage 106). These database access procedures may also be accessible to other programs running on the processor 102 via the programmatic interface provided by the operating system 118.

The portable computing device 100 includes a graphics processing component 114 that is able to render graphics in accordance with commands made by programs running on the processor 102 and output these to a touch-screen display 116 which may reside within the portable computing device 100. In alternative embodiments of the invention the touch-screen display 116 may be an external component connected to the portable computing device 100 via a composite video, component video, Video Graphics Array, Digital Visual Interface, or High-Definition Multimedia Interface connection.

Programs running on the processor 102 can process user input obtained from a user input interface 110 that receives user input from a user input device or devices (not shown). The user input devices may include a touch-screen interface of the touch-screen display 116. Alternatively or in addition user input devices may include a keypad, keyboard, mouse and/or remote control which may be incorporated within the portable computing device 100 or may be connected to it via a wired or wireless connection.

Figure 2:
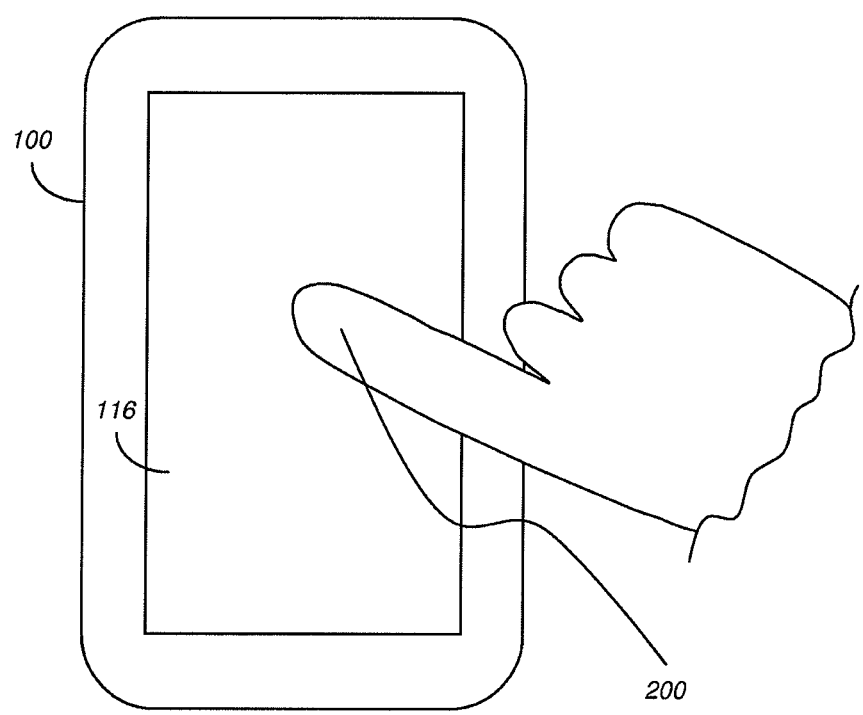

FIG. 2 shows an external view of an exemplary embodiment of the portable computing device 100. In this embodiment the portable computing device includes a touch-screen display 116 that may be touched by a user using a finger 200 in order to provide touch-screen user input that is received by the user input interface 110 and then processed by one or more programs running on the processor 102. Alternatively a stylus or other device may be used to provide the touch input. The touch-screen interface of the touch-screen display 116 may use any of a number of different known touch-sensing technologies including capacitive sensing technologies such as mutual capacitance or self capacitance, where a number of capacitive sensor elements detect touch input to the touch-screen interface.

The portable computing device 100 also includes a network interface 112 (or a plurality of such interfaces) that allows programs running on the processor 102 to transmit and receive data to and from a number of other devices and systems via a communications network 140 (or a plurality of such networks).

Figure 1B:
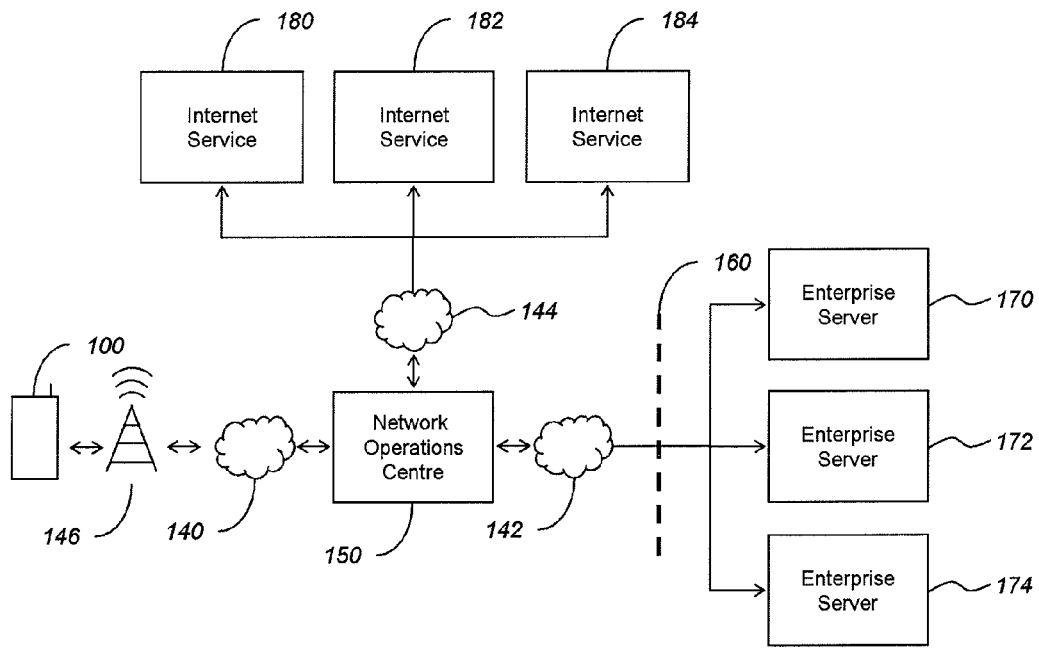

FIG. 1b schematically illustrates communication links that may be made by the portable computing device 100 using the network interface 112. The network interface 112 (or a plurality of such interfaces) may allow programs running on the processor 102 to transmit and receive data to and from a number of other devices and systems via a communications network 140 (or a plurality of such networks).

The network interface 112 (or the plurality of such interfaces) may include a radio access network interface (or a plurality of such interfaces) that is able to communicate with a wireless access node 146 such as a base station or a wireless access point that provides access to a communications network 140 (or a plurality of such networks). The network interface 112 (or plurality of such interfaces) may be able to connect to the wireless access node 146 using one or more of a number of radio access technologies including Global System for Mobile Communications (GSM), Universal Mobile Telecommunications System (UMTS), Long Term Evolution (LTE), fixed wireless access (such as IEEE 802.16 WiMax), and wireless networking (such as IEEE 802.11 WiFi). These communications network 140 and/or wireless access node 146 may also provide access to the Internet.

The network interface 112 (or the plurality of such interfaces) may also include a modem and/or an Ethernet card or interface for use with a corresponding communications network (or networks) 140 such as the Internet and/or a private data communications network.

The operating system 118 may provide messaging procedures for sending and receiving messages such as Short Messaging Services (SMS), Multimedia Messaging Services (MMS) and e-mail via the wireless access node 146 and/or the communications network 140 by using the network interface 112. These messaging procedures may be accessible to other programs running on the processor 102 via the programmatic interface provided by the operating system 118.

The operating system 118 may include a networking program that allows communication between programs running on the processor 112 and external devices via the network interface 112 and communications network 140 (or plurality of such networks) using networking protocols such as (for example) the Transmission Control Protocol (TCP) or the User Datagram Protocol (UDP). External devices which can be communicated with via the communications network 140 may include a remote data processing device such as a Network Operations Centre (NOC) 150. The networking program and/or networking procedures may be accessible to other programs running on the processor 102 via the programmatic interface provided by the operating system 118.

The NOC 150 may be a computer server (or a plurality of computer servers) with a network interface via which the NOC 150 may be connected to the communications network 140. The network interface of the NOC 150 may also allow the NOC 150 to communicate via a communications network 142 with other remote data processing devices such as one or more enterprise servers 170, 172, 174 that are connected to an enterprise network (not shown). The one or more enterprise servers 170, 172, 174 may be a computer server (or a plurality of computer servers) that reside within the enterprise network. The communications network 142 via which the NOC 150 may access the one or more enterprise servers 170, 172, 174 may be the same communications network as the communications network 140 via which the portable computing device 100 may access the NOC 150 and/or may include the Internet.

In order to access content and services provided by remote data processing devices such as the NOC 150 and one or more enterprise servers 170, 172, 174 a user of the portable computing device 100 may use a client program 120 on the portable computing device 100. The client program 120 may be pre-loaded onto the portable computing device 100 before purchase of the portable computing device 100 by the user. Alternatively the client program 120 may be downloaded and installed onto the portable computing device 100 by the user, for example by the user using an application store program provided by the operating system 118 to download (and install) the client program 120 from an application store server via the communications network 140.

The user may use the operating system 118 to start the client program 120 once it is installed on the portable computing device 100. The client program 120 may include a number of components that are configured to allow the user to access services provided by remote data processing devices such as the NOC 150 and one or more enterprise servers 170, 172, 174. These components of the client program 120 may include a rendering engine 122, core services 124, service plugins 126, application services 128 and applications 130. These components may use the programmatic interface provided by the operating system 118 (i.e. system calls) to request functionality from the operating system 118 (for example to access the file system, send/receive messages, use the network interface 112, etc).

The client program 120 may comprise a rendering engine 122 that is able to parse HyperText Mark-up Language (HTML) documents (and/or variant document types such as extensible HTML or eXtensible Mark-up Language) and display these on the touch-screen display 116 of the portable computing device 100 by using the graphics processing component 114 in order to display one or more user interfaces. The rendering engine 122 may also be able to interpret Cascading Style Sheets (CSS) documents when displaying HTML documents in order to use these to determine how the HTML documents should be presented (i.e. in terms of layout, colours, fonts, etc). When displaying HTML documents the rendering engine 122 may make use of functionality provided by the operating system 118 in order to display user interface elements with a look and feel consistent with that of the operating system 118.

The rendering engine 122 may include a resource management component that manages the retrieval of documents via the communications network 140 (e.g. from the one or more enterprise servers 170, 172, 174 and/or from the NOC 150) and the storage of these documents in non-volatile storage 106 for later re-use (i.e. caching). Documents that the rendering engine 122 may retrieve and cache may include HTML, CSS, JavaScript, images, video and any other documents that may be needed in order to render an HTML document parsed by the rendering engine 122.

The rendering engine 122 may be configured to interpret JavaScript programs embedded in HTML documents and/or may be configured to interpret JavaScript programs contained in JavaScript files. The rendering engine 122 may be configured to parse plain-text JavaScript programs and/or JavaScript programs that may have been pre-compiled into JavaScript byte-code. Pre-compiled JavaScript byte-code provides several advantages over plain-text JavaScript as it is less computationally expensive to interpret (and hence also requires less power to interpret), and requires less storage (and less transmission bandwidth) than plain-text JavaScript.

The rendering engine 122 allows JavaScript programs (i.e. either pre-compiled or plain-text) that are interpreted by the rendering engine 122 to interact with HTML documents displayed by the rendering engine by executing programmatic functions and accessing programmatic variables and objects relating to those HTML documents i.e. by accessing the Document Object Models (DOMs) of those documents.

The client program 120 may comprise core services 124 that provide a programmatic JavaScript interface for JavaScript programs interpreted by the rendering engine 122 to request functionality from the operating system 118, for example by wrapping (in JavaScript) the system calls provided by the operating system 118 and/or by providing JavaScript functions, variables and objects that allow direct interaction with the operating system 118. Thus JavaScript programs interpreted by the rendering engine 122 may perform any of the operations that could be performed by a program programmed to run natively on the portable computing device 100. Examples of functionality that the core services 124 may expose to JavaScript programs interpreted by the rendering engine include: file system operations for interacting with the file system provided by the operating system 118, database operations for interacting with a database engine (or engines) provided by the operating system 118, messaging operations for sending, receiving and accessing e-mails and messages (e.g. SMS and MMS), and other operations described in further detail below.

The client program 120 may comprise service plugins 126 that, like the core services 124, provide a JavaScript interface for JavaScript programs interpreted by the rendering engine 122 to request functionality from the operating system 118. The service plugins 126 however may not be included with the client program 120 when it is first installed on the portable computing device 100, but instead may later be retrieved from the one or more enterprise servers 170, 172, 174 or NOC 150 in order to provide a JavaScript interface for additional functionality not made available by the core services 122.

The rendering engine 122 may be configured to run a number of application services 128 and applications 130 that may each consist of JavaScript programs (interpreted by the rendering engine 122) providing programmatic functionality and HTML documents (parsed by the rendering engine 122) providing one or more user interface. The applications 130 may be used to display user interfaces and provide programmatic functionality to allow a user to access services provided by remote data processing devices such as the NOC 150 and one or more enterprise servers 170, 172, 174. The application services 128 may be used to provide services running in the background of the applications 130, such as accessing client program 1120 updates provided by the NOC 150 and/or one or more enterprise servers 170, 172, 174, installing new applications 130, service plugins 126, etc., and making applications 130 that the user is entitled to use accessible via a user interface provided by the client program 120.

The applications 130 may include a catalogue application that provides a user interface allowing the user to enter identification and authentication details (e.g. a username and password) for transmission to the NOC 150. The authentication user interface of the catalogue application may be the first user interface that is displayed to a user when the client program 120 is started. Once a user has entered identification and authentication details using this user interface these details may be transmitted to the NOC 150 in order to identify and authenticate the user, as is described in greater detail below. The catalogue application may also provide a user interface to the user that allows other applications 130 to be started and/or new applications 130 to be acquired from the NOC 150 and/or one or more enterprise servers 170, 172, 174.

Applications 130 besides the catalogue application may provide the user with means for securely accessing content and services provided by remote data processing devices. The content and services accessible to a user of the client program 120 via the applications 130 may be controlled remotely by administrators of the remote data processing devices (such as the NOC 150 and/or one or more enterprise servers 170, 172, 174).

General access to the one or more enterprise servers 170, 172, 174 and the enterprise network from the communications network 142 (e.g. the Internet) may typically be prevented by a firewall 160 placed between the communications network 142 and the enterprise network such that all network traffic that passes between the communications network 142 and enterprise network can be monitored and (optionally) discarded if it does not satisfy the firewall's criteria. For example the firewall 160 may be configured to only allow network connections between the NOC 150 and one or more enterprise servers 170, 172, 174, and to discard all other network connections from the communications network 142 to the one or more enterprise servers 170, 172, 174 and/or the enterprise network.

The one or more enterprise servers 170, 172, 174 may provide access to enterprise services including enterprise email services for storing, sending and receiving email, enterprise file sharing services for storing and retrieving files, enterprise database services for accessing and modifying an enterprise database (or databases), and enterprise personal information management (PIM) services for accessing and modifying personal information such as contact lists, calendars, task lists, etc. Each of these services may be provided by the one or more enterprise servers 170, 172, 174 and/or by one or more other servers within the enterprise network to which the one or more enterprise servers 170, 172, 174 may connect in order to provide access to those services.

The NOC 150 may be used by applications 130 of the client program 120 to access the one or more enterprise servers 170, 172, 174 and the services they provide via the communications network 140, i.e. from outside the enterprise network and the firewall 160. In order to do this the user of the client program 120 is first identified and authenticated by the NOC 150 and/or one or more enterprise servers 170, 172, 174, by the user entering his identification and authentication details in the user interface provided by the catalogue application.

Once the user has entered his identification and authentication details into the catalogue application they may be transmitted by the catalogue application to the NOC 150 over a secure (e.g. encrypted) data connection established over the (relatively insecure) communications network 140. Once the user has been identified and authenticated by the NOC 150 the client program 120 may maintain a data connection between it and the NOC 150 in order to allow communication between the client program 120 (i.e. and its components e.g. 122, 124, 126, 128, 130) and the NOC 150. This data connection may be a secure connection over the data communications network 140.

The applications 130 may use the data connection between the client program 120 and the NOC 150 to send data to the NOC 150 which the NOC 150 may forward to the one or more enterprise servers 170, 172, 174. The applications 130 may also use the data connection between the client program 120 and the NOC 150 to receive data from the NOC 150 which the NOC 150 has received from the one or more enterprise servers 170, 172, 174. Thus the NOC 150 may act as a relay between the applications 130 of the client program 120 and the one or more enterprise servers 170, 172, 174.

By sending data to and receiving data from the one or more enterprise servers 170, 172, 174 in this way the applications 130 may access the enterprise services as described in greater detail for exemplary applications 130 below. The data connection between the client program 120 and the NOC 150 may also be used to 'push' information received from the one or more enterprise servers 170, 172, 174 to applications 130 of the client program 120, as is described in more detail below.

The network interface of the NOC 150 may also allow the NOC 150 to communicate via a communications network 144 with other remote data processing devices such one or more third party computer servers 180, 182, 184. The communications network 144 via which the NOC 150 may access the one or more third party computer servers 180, 182, 184 may be the same communications network as communications network 140 via which the portable computing device 100 may access the NOC 150 and/or may include the Internet.

The NOC 150 may provide the applications 130 with access to the third party computer servers (via the data connection between the client program 120 and the NOC 150). The one or more third party computer servers 180, 182, 184 may provide Internet services that may be maintained by third parties. The Internet services may include Internet-based email services such as Hotmail or GMail, Internet-based social networking services such as Facebook or Twitter, Internet-based PIM services such as Google Calendar, etc. The NOC 150 may alternatively or additionally provide one or more of these services internally e.g. within a computer server (or computer servers) of which the NOC 150 is comprised.

The NOC 150 may regularly poll, or register for occasional update notifications from, the Internet services for updates (such as new emails, new Facebook updates, etc.) associated with the user of the client program 120, and if any updates are available information relating to these may be transmitted to the client program 120 via the communications network 140. The data connection between the client program 120 and the NOC 150 may be used by the NOC 150 to 'push' information received from Internet services to the applications 130 of the client program 120, as is described in greater detail below.

The client program 120 may access a secure database that may be held in volatile storage 106 that is used to store information relating to the user. The secure database may also be used to store cached information received by the client program (and any of its components) from the NOC 150 and/or one or more enterprise servers 170, 172, 174. By storing information in a secure database the client program 120 ensures that only it can access information stored within the secure database, thus the user (or a person who has gained unauthorised accessed to the portable computing device 100) is prevented from accessing such information using other programs of the portable computing device 100.

The client program 120 may be configured to receive instructions from the NOC 150 and/or one or more enterprise servers 170, 172, 174 to remove information from the secure database or to delete the secure database entirely. The NOC 150 and/or one or more enterprise servers 170, 172, 174 may be configured by an administrator to transmit such instructions to a client program 120 running on a portable computing device 100 by storing a flag indicating that such instructions should be transmitted. The NOC 150 and/or one or more enterprise servers 170, 172, 174 may be configured to transmit such instructions to the client program 120 of a particular portable computing device 100 by storing the International Mobile Equipment Identity (IMEI) of that portable computing device 100 with the flag indicating that such instructions should be transmitted. When the client program 120 is started it may be configured to contact the NOC 150 (and, if necessary, the one or more enterprise servers 170, 172, 174) and transmit the IMEI of the portable computing device 100 to the NOC 150 and/or one or more enterprise servers 170, 172, 174. The NOC 150 and/or one or more enterprise servers 170, 172, 174 may then respond with instructions to the client program to delete the secure database if a flag indicating such instructions should be transmitted to the portable computing device 100 with that IMEI number has been stored at the NOC 150 and/or one or more enterprise servers 170, 172, 174. This allows an administrator to ensure that the secure database is immediately deleted on starting of the client program 120 in the event that a person gains unauthorised access to a portable computing device 100 or a previous user loses authorisation to access the NOC 150 and/or one or more enterprise servers 170, 172, 174.

By providing a client program 120, NOC 150 and one or more enterprise servers 170, 172, 174 configured in the manner described above a number of advantages may be obtained as follows.

Firstly, the applications 130 may be easily ported to different portable computing devices with different operating systems, processors etc. without re-writing the program code of the applications 130, as the applications comprise JavaScript and HTML documents which are interpreted or parsed by the rendering engine 122 of the client program 120. In order to use the client program 120 on a new portable computing device the rendering engine, core services 124 and service plugins 126 may be tailored to the operating system, processor (etc) of the new portable computing device. However it may be not necessary to tailor an update to an existing application 130 or a new application 130 to different portable computing devices. A common set of functionality and user interfaces may thus be provided by the applications 130 across a range of different portable computing devices.

Secondly, the system described allows the applications 130 to securely access the NOC 150 and one or more enterprise servers 170, 172, 174 over the communications network 140, whilst ensuring that the one or more enterprise servers 170, 172, 174 and enterprise network are not generally accessible via the communications network 142. The NOC 150, which serves as an access point to the enterprise network for the client program 120, remains outside the firewall 160 and hence if the NOC 150 fails or is compromised the one or more enterprise servers 170, 172, 174, enterprise network and the content they contain remain secure and inaccessible via the communications network 142.

Thirdly, by maintaining a secure data connection between the client program 120 and the NOC 150 and using this connection to 'push' updates from the one or more enterprise servers 170, 172, 174 and/or Internet services to the applications 130, the client program 120 need not regularly poll the one or more enterprise servers 170, 172, 174 and/or Internet services for updates or new content. Instead the applications 130 can be informed of updates or new content available at the one or more enterprise servers 170, 172, 174 when they become available. In addition the NOC 150 can poll the Internet services for updates or new content on behalf of the applications 130, and inform the applications 130 when they become available. This reduces the battery power, processing power and communications bandwidth that would otherwise be consumed by the portable computing device 100 if the applications 130 polled the NOC 150, one or more enterprise servers 170, 172, 174 and/or Internet services for updates.

Each application of the applications 130 may be configured to provide a workspace service that provides functions for accessing, creating, and editing workspace data objects. As described in greater detail below, examples of workspace data object include an email, contact entry, calendar entry, task entry, document, message or information stored by a social network, etc. Each workspace data object may include a number of characteristics, examples of which are given below. In alternative embodiments of the invention each application of the applications 130 may be configured to provide one or more workspace services, where each workspace service provided by an application provides functions for accessing, creating, and editing a different type of workspace data object.

The applications 130 may include an email application for accessing, editing, sending and receiving emails. The email application may thus provide a workspace service for accessing, creating, and editing workspace data objects that are emails and that include characteristics such as email subject, email attachments, email body, recipients, sender, date sent, etc. In order to send and/or receive emails the email application may use the enterprise email services and or Internet-based email services via the data connection maintained between the client program 120 and the NOC 150 as described above, with the NOC 150 communicating with the Internet services and/or one or more enterprise servers 170, 172, 174 if required. Copies of emails accessed, sent and/or received via the NOC 150, Internet services and/or one or more enterprise servers 170, 172, 174 may be cached by the email application in the secure database of the client program 120.

The applications 130 may include a contacts application for accessing and editing one or more lists of contacts. Each list of contacts may comprise contact entries, where each contact entry comprises characteristics relating to a contact which may include the contact's name, information relating to how that contact may be contacted via e-mail, telephone, social networks, etc, the contact's postal address, company name, etc. The contacts application may thus provide a workspace service for accessing, creating, and editing workspace data objects that are contact entries.

The applications 130 may include a calendar application for accessing and editing one or more calendars. Each calendar may comprise calendar entries, where each calendar entry may include characteristics such as a calendar entry subject, a location associated with the entry, start and end times for the calendar entry, a list of contacts associated with the entry, etc. The calendar application may thus provide a workspace service for accessing, creating, and editing workspace data objects that are calendar entries.

The applications 130 may include a tasks application for accessing and editing one or more tasks lists. Each task list may comprise task entries, where each task entry may include characteristics such as a task subject, a task due date, a list of other entities such as contacts, emails or documents associated with the task, etc. The tasks application may thus provide a workspace service for accessing, creating, and editing workspace data objects that are task entries.

The applications 130 may include a document manager application for accessing and editing one or more documents. Each document may comprise one or more document types including formatted text, spreadsheets, drawings, images, presentations, audio and/or video, and each document may include document characteristics associated with each of these document types. Each document may also include characteristics including who owns, has created, and/or has access to the document. The document manager application may thus provide a workspace service for accessing, creating, and editing workspace data objects that are documents.

The applications 130 may include a messaging application for accessing, editing, sending and receiving messages. Each message may comprise characteristics such as a message type indicating whether the message is an SMS message, MMS message, instant message, etc, as well as who the message was sent from/to, the content of the message, when it was sent, etc. The messaging application may be configured to use the network interface of the portable computing device to send and/or receive these messages. Instant messages may be sent and/or received via instant messaging services available via the communications network 140 such as Windows Live Messenger, AIM, etc. The message application may thus provide a workspace service for accessing, creating, and editing workspace data objects that are messages.

The applications 130 may include a social networks application for accessing one or more social networks which may include social networks such as Facebook, MySpace, Twitter, etc. The social networks application may access social networks made available by the Internet-based social networking services. The social networks application may thus provide a workspace service for accessing, creating, and editing workspace data objects that include characteristics such as messages and/or information sent to or received from a social network.

The workspace data objects that may be accessed, created and/or edited by the workspace service (or workspace services) provided by each application of the applications 130 may include workspace data objects stored by remote data processing devices such as the NOC 150, Internet services and/or one or more enterprise servers 170, 172, 174. These workspace data objects stored by the NOC 150, Internet services and/or one or more enterprise servers 170, 172, 174 may be accessed, created and/or edited by an application 130 using the data connection maintained between the client program 120 and the NOC 150 as described above, with the NOC 150 then communicating with the Internet services and/or one or more enterprise servers 170, 172, 174 if required. The contacts application, calendar application and tasks application may, for example use this method to access, create and edit workspace data objects stored in the enterprise PIM services and/or Internet-based PIM services. Copies of one or more of the workspace data objects may be cached in the secure database of the client program 120.

The applications 130 may allow the user to provide identification and authentication information for use in accessing the Internet services. This identification and authentication information may be stored by the applications 130 in the secure database of the client program 120 and used by the applications 130 when the Internet services need to be accessed. The identification and authentication information may also be associated with the user and stored by the NOC 150 so that it can access the Internet services on the user's behalf when necessary.

The email application, contacts application, tasks application, calendar application, document manager application, message application, social networks application and other applications 130 may be configured to provide one or more user interfaces allowing the user to control the functions provided by these applications as described above. These user interfaces may be described in the form of HTML documents and rendered by the rendering engine 122 as described above.

As described above the applications 130 of the client program 120 may be configured to provide functions for editing workspace data objects. These may include functions for associating a first workspace data object with a first workspace service and for providing a workspace service editor for editing a second workspace data object. For example, the first workspace data object could be an email that is provided by the workspace service of the email application, and the first workspace service could be the workspace service provided by the tasks application.

The second workspace data object may be populated with at least some data from the first workspace data object according to the association of the first workspace data object with the first workspace service. For example, the second workspace object could be a new task entry in the tasks application which is populated with information from an email (i.e. the first workspace data object in this example) according to the association of the email with the workspace service provided by the tasks application (i.e. the first workspace service in this example).

Characteristics of the association of the first workspace data object with the first workspace service may be determined by touch-screen user input in a plurality of user interface configurations. In order to allow characteristics of this association to be easily entered by a user of the portable computing device 100 despite the relatively small size of the touch-screen display 116, the plurality of user interface configurations may require relatively little user input to the plurality of user interface configurations, as is described in greater detail below.

Figure 3:
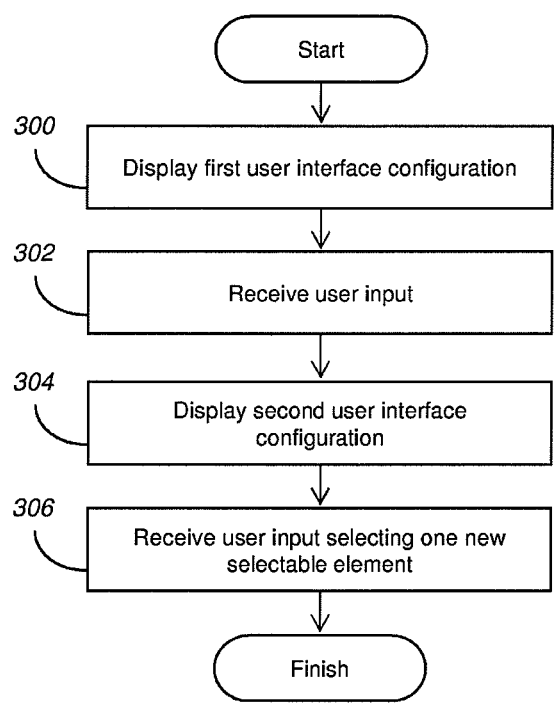
FIG. 3 illustrates steps typically performed by applications of a client program of the portable computing device of FIG. 1a in accordance with an embodiment of the invention.

FIG. 3 illustrates steps typically performed by applications 130 of the client program 120 in order to allow characteristics of the association of a first workspace data object with a first workspace service to be entered by a user of the portable computing device 100.

Firstly, a first user interface configuration may be displayed by a first application of the applications 130 (step 300). The first user interface configuration may be one of the plurality of user interface configurations into which touch-screen user input may be entered in order to characterise the association of the first workspace data object with the first workspace service. The first user interface configuration may be one of the user interfaces displayed by the first application during use of the first application by the user, and it may be displayed by the first application during provision of a workspace service for reviewing workspace data objects. For example, the first user interface may be displayed by the email application during normal use of the email application by the user to review a list of emails sent and/or received by the user.

In the first user interface configuration the first application may display selectable elements in a plurality of areas of the touch-screen display 116, including a first display area in which at least one selectable element is displayed corresponding to a workspace data object, and a second display area in which at least one selectable element is displayed for the selection of a workspace service. Alternatively the at least one selectable element may include a plurality of selectable elements, where each selectable element corresponds to a different workspace data object.

The first application may connect to a remote data processing device such as the NOC 150, Internet services and/or one or more enterprise servers 170, 172, 174 (e.g. using the data connection maintained between the client program 120 and the NOC 150 as described above), in order to receive one or more workspace data objects from the remote data processing device during the provision of a workspace service for reviewing workspace data objects. Each workspace data object in the one or more workspace data objects may correspond with one of the selectable elements in the at least one selectable element (or plurality of selectable elements). In this way the one or more workspace data objects may be updated at the portable computing device 100 during the provision of a workspace service for reviewing workspace data objects.

An example of a first user interface configuration is shown in FIG. 4a, which is an exemplary screen displayed by the email application. The first user interface displayed in FIG. 4a includes a first display area, indicated by the dashed box 400, in which a number of selectable elements 402, 404, 406, 408 are displayed. Each of the selectable elements 402, 404, 406, 408 correspond to a workspace data object, in this case an email that may have been sent or received by the user. The first user interface also includes a second display area, indicated by the dashed box 420, in which a number of selectable elements 422, 424, 426 are displayed. Each of the selectable elements 422, 424, 426 may allow the selection of a workspace service, for example selectable element 422 allows the selection of the workspace service provided by the contacts application, selectable element 424 allows the selection of the workspace service provided by the calendar application, and selectable element 426 allows the selection of the workspace service provided by the tasks application.

Once the first user interface configuration has been displayed by the first application, touch-screen user input may be received by the client program 120 from the user input interface 110 (step 302). This touch-screen user input may be due to user input to the touch-screen display 116 and/or may include one or more of several different inputs that are described in detail below.

In response to the touch-screen user input received in the first user interface configuration a second user interface configuration may be displayed (step 304). The second user interface configuration may be one of the plurality of user interface configurations into which touch-screen user input may be entered in order to characterise the association of the first workspace data object with the first workspace service.

The second user interface configuration may be displayed by a second application of the applications 130. The second application is in one embodiment the same application as the first application and in other embodiments a different application.

In the second user interface configuration a plurality of display areas may be displayed in the touch-screen display 116. The plurality of display areas may include the first display area and the second display area originally displayed in the first user interface configuration. However in the second user interface configuration at least one new selectable element may be displayed in at least a part of at least one of the first display area and the second display area of the first user interface configuration. The at least one new selectable element displayed in the second user interface configuration may be determined according to the touch-screen user input received in the first user interface configuration, as is described in greater detail below. The at least one new selectable element may include a plurality of new selectable elements.

Once the second user interface configuration has been displayed, touch-screen user input may be received from the user input interface 110 (step 306). This touch-screen user input may be due to user input to the touch-screen display 116. The touch-screen user input may involve the selection of one of the at least one new selectable element, and may include one or more of several different inputs or gestures that are described in detail below.

By selecting one of the at least one new selectable element the touch-screen user input that is received in the second user interface configuration may determine a characteristic of the second workspace data object, as is described in greater detail below.

The steps outlined in FIG. 3 and the description above allow a number of alternative embodiments of the invention that enable the association of a first workspace data object with a first workspace service and the determination of a characteristic of a second workspace data object. A number of examples of these alternative embodiments are described in detail below.

A first exemplary embodiment of the invention will now be described within the context of the steps of FIG. 3.

Initially, in accordance with step 300 described above, a first user interface configuration may be displayed by a first application of the applications 130.

Touch-screen user input may then be received in the first user interface configuration from the user input interface 110 in accordance with step 302. This touch-screen user input may include a first user input action for selecting a selectable element in the first display area. The selectable element selected by the first user input action may correspond with a first workspace data object which is thereby selected by the first user input action.

For example, in the first user interface configuration shown in FIG. 4a the first user input action may select selectable element 406 in the first display area 400. The selected selectable element 406 corresponds with a workspace data object that is an email which may therefore be selected as the first workspace data object.

Touch-screen user input received in the first user interface configuration in step 302 may include a second user input action for selecting a selectable element in a different display area to the first display area. The second user input action may be received after the first user input action.

The selectable element in a different display area selected by the second user input action in step 302 may be used by the applications 130 to determine the at least one new selectable element that is displayed in the second user interface configuration in step 304 of FIG. 3, described above.

The second user input action may, for example, select a selectable element in the second display area, and may thereby select the first workspace service which is the workspace service that corresponds to the selectable element selected by the second user input action.

For example, in the first user interface configuration shown in FIG. 4a the second user input action may select selectable element 424 in the second display area 420. The selected selectable element 424 corresponds with a workspace service provided by the calendar application which may therefore be selected as the first workspace service.

The first user input action received in step 302 may include a press input received from the touch-screen display 116 and caused by the user pressing on the touch-screen display 116 at the position of a selectable element in the first display area (for example selectable element 406) of the first user interface configuration.

The second user input action received in step 302 may include movement input received from the touch-screen display 116 in response to the user moving his finger on the touch-screen display 116. This movement input may begin at the position of the selectable element in the first display area (for example selectable element 406) of the first user interface configuration. The movement input may pause, for at least a predetermined time period (such as one second) at the position of a selectable element in the second display area (for example selectable element 426) of the first user interface configuration.

In response to the detection of touch-screen user inputs received in the first user interface configuration in step 302 a second user interface configuration may be displayed in accordance with step 304. The second user interface may be displayed by a second application, which could be the same application as the first application or a different application.

In the second user interface configuration at least one new selectable element may be displayed in accordance with step 304. The at least one new selectable element may be displayed in at least a part of the first display area, and may replace at least one selectable element displayed in the first display area of the first user interface configuration.

The at least one new selectable element may correspond with an action (or actions) that the workspace service provided by the second application may be able to perform with the first workspace data object. For example, where the first workspace data object is an email and the second application is the email application, the at least one new selectable element may correspond with actions such as forwarding the email, or replying to the email. In another example, where the first workspace data object is an email and the second application is the calendar application, the at least one new selectable element may correspond with actions such as creating a new meeting relating to the email at one of several dates. In another example, where the first workspace data object is a contact entry and the second application is the email application, the at least one new selectable element may correspond with actions such as creating a new email addressed to the contact, or forwarding the contact entry to another contact.

The at least one new selectable element may alternatively correspond with a workspace data object (or objects) that the workspace service provided by the second application allows the access, creation or editing of. The second application may allow an association between the workspace data object (or objects) that the at least one new selectable element correspond with and the first workspace data object. For example, where the first workspace data object is a file and the second application is the contacts application, the at least one new selectable element may correspond with contact entries that the first workspace object may be sent to (e.g. in an email) or associated with.

An example of a second user interface configuration is shown in FIG. 4b, which is an exemplary screen displayed by a second application which in this case is the calendar application. The second user interface displayed in FIG. 4b includes a first display area, indicated by the dashed box 430, in which a number of selectable elements are displayed including selectable element 432. These selectable elements form the at least one new selectable element that is displayed in the second user interface configuration, and replace the at least one selectable element that was displayed in the first display area of the first user interface configuration, which in this example was the first display area 400 of the first user interface configuration shown in FIG. 4a.

Once the second user interface configuration has been in step 304, touch-screen user input may be received in the second user interface configuration from the user input interface 110 in accordance with step 306.

This touch-screen user input may include a third user input action to select one of the at least one new selectable element (or plurality of new selectable elements) displayed in the second user interface configuration.

For example, in the second user interface configuration shown in FIG. 4b the third user input action may select the new selectable element 432 in the first display area 420.

By selecting one of the at least one new selectable element the touch-screen user input (e.g. the third user input action) that is received in the second user interface configuration may determine a characteristic of a second workspace data object.

The second workspace object may be a new workspace object that is created by the second application in response to touch-screen user input received in the second user interface configuration. For example, the second workspace object could be a new calendar entry created by the calendar application in response to touch-screen user input received in the second user interface configuration.

The second workspace object may alternatively be an existing workspace object that is edited by the second application in response to touch-screen user input received in the second user interface configuration. For example, the second workspace object could be an existing calendar entry edited by the calendar application in response to touch-screen user input received in the second user interface configuration.

The touch-screen user input that is received in the second user interface configuration may determine a characteristic of the second workspace data object.

For example, the touch-screen user input in the second user interface configuration may include a third user input action selecting a selectable element that corresponds to a date in a calendar, such as the date represented by selectable element 432 in the first display area 430 of the second user interface configuration shown in FIG. 4b. The date represented by the selected selectable element may determine a characteristic for the second workspace data object such as the start and/or end time for a new calendar entry created by the calendar application.

The second workspace data object may be populated with at least some data from the first workspace data object according to the association of the first workspace data object with the first workspace service.

For example for a second workspace data object that is a calendar entry, characteristics such as the subject and/or list of contacts associated with the second workspace data object may be populated with data from the first workspace object. If the first workspace object is for example an email, the subject of the second workspace object may be set the same as the subject of the first workspace object, and the list of contacts associated with the second workspace object may be set as the recipients of the first workspace object.

The second application may connect to a remote data processing device such as the NOC 150, Internet services and/or one or more enterprise servers 170, 172, 174 (e.g. using the data connection maintained between the client program 120 and the NOC 150 as described above), in order to transmit the second workspace data object to the remote data processing device during the provision of the workspace service for editing workspace data objects provided by the second application. In this way the second workspace data object, characteristics of which have been determined by touch-screen user input, may be updated at the remote data processing device.

The third user input action received in step 306 may include movement input received from the touch-screen display 116 in response to the user moving his finger on the touch-screen display 116. This movement input may end at the position of one of the at least one new selectable element in the first display area (for example selectable element 432) of the second user interface configuration.

The touch-screen user input in the plurality of different user interface configurations may be in the form of continuous movement input to the touch-screen display 116 between the different user interface configurations. For example movement input may continue through the first user input action, second user input action and third user input action, without the user removing his finger (or other input device) from the touch-screen display 116. The continuous movement input may include at least one pause, for a pre-determined time period, at the position of a selectable element and/or an at least one new selectable element in at least one of the plurality of different user interface configurations.

In response to touch-screen user input received in the second user interface configuration (e.g. the third user input action), a workspace service editor may be displayed to allow the user to edit the second workspace data object. The workspace service editor may be displayed by the second application that may have created the second workspace object in response to the touch-screen user input received in the second user interface configuration.

FIG. 4c shows an exemplary screen displayed by the calendar application (i.e. the second application), which includes a workspace service editor, indicated by the dashed box 440, for editing a second workspace data object that has been created by the calendar application in response to touch-screen user input received in the second user interface configuration such as the one shown in FIG. 4b. The workspace service editor may comprise a number of fields 442, 444, 446, 448, 450, that can be edited by the user and that correspond to characteristics of the second workspace data object.

The workspace service editor may comprise one or more selectable elements, indicated within the dashed box 460, that correspond to actions that the user may perform with the second workspace data object, such as for example saving changes made by the user to the characteristics of the second workspace data object to the secure database of the client program 120 and/or a remote data processing device.

A second exemplary embodiment of the invention will now be described within the context of the steps of FIG. 3.

The second embodiment may proceed according to the steps performed by the first embodiment of the invention described above. However in the first user interface configuration of the second embodiment, the second user input action received in step 302 may be received before the first user input action.

The second user input action received in step 302 may include movement input received from the touch-screen display 116 in response to the user moving his finger on the touch-screen display 116. This movement input may begin at the position of a selectable element in the second display area (for example selectable element 426) of the first user interface configuration. The first user input action received in step 302 may include movement input received from the touch-screen display 116 in response to the user moving his finger (or other input device) on the touch-screen display 116. This movement input may pause, for at least a predetermined time period (such as one second) at the position of a selectable element in the first display area (for example selectable element 406) of the first user interface configuration.

As in the first embodiment, in response to the touch-screen user input received in the first user interface configuration in step 302 a second user interface configuration may be displayed in accordance with step 304. The second user interface may be displayed by a second application, which may be the same application as the first application or a different application.

In the second user interface configuration the at least one new selectable element displayed in accordance with step 304 may be displayed in at least a part of the second display area (rather than in the first display area as in the first embodiment). The at least one new selectable element may replace at least one selectable element displayed in the second display area of the first user interface configuration.

An example of a second user interface configuration is shown in FIG. 4d, which is an exemplary screen displayed by the second application which in this case is the calendar application. The second user interface displayed in FIG. 4d includes a second display area, indicated by the dashed box 470, in which a number of selectable elements 472, 474, 476 are displayed. These selectable elements form the at least one new selectable element that is displayed in the second user interface configuration, and replace the at least one selectable element that was displayed in the second display area of the first user interface configuration, which in this example was the second display area 420 of the first user interface configuration shown in FIG. 4a.

Once the second user interface configuration has been displayed by the second application in step 304, touch-screen user input may be received by the second application from the user input interface 110 in accordance with step 306.

This touch-screen user input may include a third user input action to select one of the one new selectable element (or plurality of new selectable elements) displayed in the second user interface configuration.

For example, in the second user interface configuration shown in FIG. 4d the third user input action may select the one new selectable element 474 in the second display area 470.

As in the first embodiment, by selecting one or more of the at least one new selectable element the touch-screen user input (e.g. the third user input action) that is received in the second user interface configuration may determine a characteristic of a second workspace data object.

The third user input action received in step 306 may include movement input received from the touch-screen display 116 in response to the user moving his finger on the touch-screen display 116. This movement input may end at the position of one of the at least one new selectable element in the second display area (for example selectable element 474) of the second user interface configuration.

The touch-screen user input in the plurality of different user interface configurations may be in the form of continuous movement input to the touch-screen display 116 between the different user interface configurations in accordance with the first embodiment.

In response to touch-screen user input received in the second user interface configuration (e.g. the third user input action), a workspace service editor user interface may be displayed to allow the user to edit the second workspace data object, in accordance with the first embodiment.

The first and second embodiments of the invention offer flexibility to the user when entering touch-screen user input for associating a first workspace data object with a first workspace service, as the user may select the first workspace data object first (from the first display area in the first embodiment), or the first workspace service first (from the second display area in the second embodiment).

A third exemplary embodiment of the invention will now be described within the context of the steps of FIG. 3.

The third embodiment may proceed according to the steps performed by the first embodiment of the invention described above. However the second user input action received in the first user interface configuration of the third embodiment is for causing the at least one new selectable element to be displayed, and touch-screen user input in the second user interface configuration is used to select the first workspace service using the one new selectable element.

Initially, in accordance with step 300 described above, a first user interface configuration may be displayed by a first application of the applications 130.

Touch-screen user input may then be received by the first application from the user input interface 110 in accordance with step 302.

An example of a first user interface configuration according to this embodiment is shown in FIG. 5a, which is an exemplary screen displayed by the email application. The first user interface displayed in FIG. 5a includes a first display area, indicated by the dashed box 500, in which a number of selectable elements including selectable element 502 are displayed. Each of the selectable elements correspond to a workspace data object, in this case an email that may have been sent or received by the user. The first user interface also includes a second display area, indicated by the dashed box 510, in which a number of selectable elements including selectable element 510 are displayed. Each of the selectable elements allows the selection of a workspace service.

Touch-screen user input received in the first user interface configuration in step 302 may include a second user input action for selecting a selectable element in a different display area to the first display area. The second user input action may be received after the first user input action.

The selectable element in a different display area selected by the second user input action in step 302 may be used by the applications 130 to determine the at least one new selectable element that is displayed in the second user interface configuration in step 304 of FIG. 3, described above.

The second user input action may, for example, select a selectable element in the second display area, and may thereby cause at least one new selectable element to be displayed in the second user interface configuration.

For example, in the first user interface configuration shown in FIG. 5a the second user input action may select selectable element 512 in the second display area 510. Selectable element 512 may be associated with at least one workspace service not currently displayed in the second display area 510.

The first user input action received in step 302 may include movement input in accordance with the first embodiment. The second user input action received in step 302 may then include movement input in accordance with the first embodiment.

In response to the touch-screen user input received in the first user interface configuration in step 302 a second user interface configuration may be displayed in accordance with step 304. The second user interface may be displayed by the client program 120 which may be configured to display the workspace services displayed in the second display areas of the plurality of user interface configurations.

In the second user interface configuration at least one new selectable element displayed in accordance with step 304 may be displayed in at least a part of the second display area, and may replace at least one selectable element displayed in the second display area of the first user interface configuration.

An example of a second user interface configuration according to the third embodiment is shown in FIG. 5b, which is an exemplary screen displayed by the email application (first display area 500) and client program (second display area 510). The second user interface displayed in FIG. 5b includes a second display area, indicated by the dashed box 520, in which a number of selectable elements 522, 524, 526 are displayed. These selectable elements form the at least one new selectable element that is displayed in the second user interface configuration, and replace the at least one selectable element that was displayed in the second display area of the first user interface configuration, which in this example was the second display area 510 of the first user interface configuration shown in FIG. 5a.

Once the second user interface configuration has been displayed by the second application in step 304, touch-screen user input may be received from the user input interface 110 in accordance with step 306.

This touch-screen user input may include a third user input action to select one of the at least one new selectable element (or plurality of new selectable elements) displayed in the second display area of the second user interface configuration.

For example, in the second user interface configuration shown in FIG. 5b the third user input action may select the new selectable element 524 in the second display area 520.

The touch-screen user input in the second user interface configuration may select the first workspace service, which is the workspace service that corresponds to the selected one new selectable element. The first workspace service may be provided by a second application of the applications 130. The second application may be the same application as the first application or it could be a different application.

By selecting one of the at least one new selectable element, the touch-screen user input (e.g. the third user input action) that is received in the second user interface configuration may determine a characteristic of a second workspace data object.

The second workspace object may be a new workspace object that is created by the second application in response to touch-screen user input received in the second user interface configuration. For example, the second workspace data object could be a new message created by the messaging application in response to touch-screen user input received in the second user interface configuration.

The touch-screen user input that is received in the second user interface configuration may determine a characteristic of the second workspace data object.

For example, the touch-screen user input in the second user interface configuration may include a third user input action selecting a selectable element that corresponds to a workspace service, such as the workspace service of the messaging application represented by selectable element 524 in the first display area 520 of the second user interface configuration shown in FIG. 5b. The messaging application may determine a characteristic for the second workspace data object such as the type of message for a new message created by the messaging application. For example the type of message characteristic of the second workspace data object may be determined as an SMS message by the messaging application.

The second workspace data object may be populated with at least some data from the first workspace data object according to the association of the first workspace data object with the first workspace service.

For example for a second workspace data object that is a message, characteristics such as the subject and/or message text of the second workspace data object may be populated with data from the first workspace object. If the first workspace object is for example an email, the subject of the second workspace object may be set the same as the subject of the first workspace object, and the message text of the second workspace object may be set as email body of the first workspace object.

The second application may connect to a remote data processing device, in order to transmit the second workspace data object to the remote data processing device in accordance with the first embodiment.

The third user input action received in step 306 may include movement input received from the touch-screen display 116 in response to the user moving his finger on the touch-screen display 116. This movement input may end at the position of one of the at least one new selectable element in the second display area (for example selectable element 524) of the second user interface configuration.

The touch-screen user input in the plurality of different user interface configurations may be in the form of continuous movement input to the touch-screen display 116 in accordance with the first embodiment.

In response to touch-screen user input received in the second user interface configuration (e.g. the third user input action), a workspace service editor user interface may be displayed to allow the user to edit the second workspace data object. The workspace service editor may be displayed by the second application that may have created the second workspace object in response to the touch-screen user input received in the second user interface configuration.

The third embodiment of the invention thus allows a number of workspace services to be associated with the first workspace object, even if some of those workspace services may not initially be displayed in the workspace service area due to a lack of space on the touch-screen display 116.

A fourth exemplary embodiment of the invention will now be described within the context of the steps of FIG. 3.

The fourth embodiment may proceed according to the steps performed by the first embodiment of the invention described above. However after touch-screen user input is received in the second user interface configuration to select said one new selectable element, one or more further user interface configurations may be displayed.

Initially, in accordance with step 300 of the first embodiment, a first user interface configuration may be displayed by a first application of the applications 130.

An example of a first user interface configuration according to this embodiment is shown in FIG. 6a, which is an exemplary screen displayed by the document manager application. The first user interface displayed in FIG. 6a includes a first display area, indicated by the dashed box 600, in which a number of selectable elements 602, 604, 606, 608 are displayed. Each of the selectable elements 602, 604, 606, 608 correspond to a workspace data object, in this case a document that has been created by or shared with the user. The first user interface also includes a second display area, indicated by the dashed box 620, in which a number of selectable elements 622, 624, 626 are displayed. Each of the selectable elements 622, 624, 626 allows the selection of a workspace service, for example selectable element 622 allows the selection of the workspace service provided by the contacts application.

Touch-screen user input may then be received by the first application from the user input interface 110 in accordance with step 302 of the first embodiment.

In response to the touch-screen user input received in the first user interface configuration in step 302 a second user interface configuration may be displayed in accordance with step 304 of the first embodiment.

An example of a second user interface configuration is shown in FIG. 6b, which is an exemplary screen displayed by a second application which in this case is the contacts application. The second user interface displayed in FIG. 6b includes a first display area, indicated by the dashed box 630, in which a number of selectable elements 632, 636 and 638 are displayed including selectable element 634. These selectable elements form the at least one new selectable element that is displayed in the second user interface configuration, and replace the at least one selectable element that was displayed in the first display area of the first user interface configuration, which in this example was the first display area 600 of the first user interface configuration shown in FIG. 6a.

Once the second user interface configuration has been displayed by the second application in step 304, touch-screen user input may be received from the user input interface 110 in accordance with step 306 of the first embodiment.

For example, the touch-screen user input in the second user interface configuration may include a third user input action selecting a selectable element that corresponds to a contact entry, such as the contact entry represented by selectable element 634 in the first display area 630 of the second user interface configuration shown in FIG. 6*b*. The contact entry represented by the selected selectable element may determine a characteristic for the second workspace data object such as the start and/or end time for a new calendar entry created by the calendar application.

In response to the touch-screen user input received in the second user interface configuration, at least one further user interface configuration may be displayed. The at least one further user interface configuration may be displayed by the second application. The at least one further user interface configuration may comprise a plurality of further user interface configurations, each of which may be displayed in sequence in response to touch-screen user input.

In each further user interface configuration of the at least one further user interface configuration at least one new selectable element may be displayed. The at least one new selectable element may be displayed in at least part of a different display area to the at least one new selectable element displayed in the previously displayed user interface configuration, which may be the second user interface configuration or one of the at least one further user interface configurations.

For example, if in the second user interface configuration at least one new selectable element was displayed in at least a part of the first display area, then at least one new selectable element may be displayed in at least part of the second display area and replace at least one selectable element displayed in the second display area. Alternatively, if in the second user interface configuration at least one new selectable element was displayed in at least a part of the second display area, then at least one new selectable element may be displayed in at least part of the first display area and replace at least one selectable element displayed in the first display area.

The above example and alternative may be extended in a similar way to the display of a second further user interface configuration after the display of a first further user interface configuration, where each of these further user interface configurations form part of the at least one further user interface configuration.

The at least one new selectable element displayed in each further user interface configuration may correspond with an action (or actions) that the workspace service provided by the second application may be able to perform with the first workspace data object and the selected at least one new selectable element selected in the second user interface configuration. For example the selected one new selectable element is the second user interface configuration may correspond with a selected workspace data object, and the at least one new selectable element in each further user interface configuration may correspond with actions that the second application may perform on the first workspace data object and the selected workspace data object.

An example of a first further user interface configuration is shown in FIG. 6*c*, which is an exemplary screen displayed by a second application which in this case is the contacts application. The second user interface displayed in FIG. 6*c* includes an action display area, indicated by the dashed box 640, in which a number of selectable elements 642 and 644 are displayed including selectable element 646. These selectable elements form the at least one further selectable element that is displayed in the first further user interface configuration, and replace the at least one selectable element that was displayed in the second display area of the first and second user interface configuration, which in this example was the second display area 620 shown in FIGS. 6*a* and 6*b*.

An example of a second further user interface configuration is shown in FIG. 6*d*, which is an exemplary screen displayed by a second application which in this case is the contacts application. The second user interface displayed in FIG. 6*d* includes an action display area, indicated by the dashed box 650, in which a number of selectable elements 652, 654, 656, 658 are displayed. These selectable elements form the at least one new selectable element that is displayed in the second further user interface configuration, and replace the at least one new selectable element that was displayed in the second display area of the second user interface configuration, which in this example was the first display area 630 shown in FIGS. 6*b* and 6*c*.

Once a further user interface configuration of the at least one further user interface configurations has been displayed by the second application, touch-screen user input may be received in that further user interface configuration from the user input interface 110.

This touch-screen user input may include a further user input action to select one of the at least one new selectable element displayed in that further user interface configuration.

For example, in the first further user interface configuration shown in FIG. 6*c* the further user input action may select the further selectable element 646 in the second display area 640.

In another example, in the second further user interface configuration shown in FIG. 6*d* the further user input action may select the further selectable element 654 in the second display area 650.

By selecting one of the at least one new selectable element the touch-screen user input (e.g. the further user input action) that is received in a further user interface configuration may determine a characteristic of a second workspace data object.

For example, the touch-screen user input in the at least one further user interface configuration may include a further user input action selecting a selectable element that corresponds to the action of sending an email based on the first workspace object and the selected at least one new selectable element, such as the action represented by selectable element 646 in the second display area 640 of the second user interface configuration shown in FIG. 6*c*. The selected at least one selectable element may determine that the email body characteristic for the second workspace data object may be set to contain the at least some data from the first workspace object.

The user input action received in each further user interface configuration may include movement input similar to that of the first embodiment.

The touch-screen user input in the plurality of different user interface configurations may be in the form of continuous movement input to the touch-screen display 116 in accordance with the first embodiment.

In response to touch-screen user input received in a further user interface configuration, a workspace service editor user interface may be displayed to allow the user to edit the second workspace data object.

The fourth embodiment of the invention thus allows a number of different actions based on the association of the first workspace data object and first workspace service to be entered by the user. These actions may allow further characteristics of the second workspace object to be determined from the association of the first workspace object and first workspace service.

The above embodiments are to be understood as illustrative examples of the invention. Further embodiments of the invention are envisaged as follows.

It is to be understood that further user interface configurations in accordance with the fourth embodiment may also be displayed before the display of a workspace service editor (if appropriate) in the second embodiment and/or the third embodiment.

In alternative embodiments of the invention the touch-screen user input in the plurality of different user interface configurations need not be in the form of continuous movement input to the touch-screen display 116. For example, one or more of the user input actions entered in the plurality of different user interface configurations may include the user tapping at the position of a selectable element on the touch-screen display 116. Additionally or alternatively one or more of the user input actions entered in the plurality of different user interface configurations may include the user removing his finger from the touch-screen display 116 after moving his finger to the position of a selectable element in order to perform a drag and drop input action.

It is to be understood that the plurality of user interface configurations of the embodiments of the invention described above may in alternative embodiments not be displayed from within one or more applications 130 that are pre-compiled and/or interpreted JavaScript programs or similar, but could instead be displayed from within any program or programs configured to run on the portable computing device 100. Such programs may be configured to communicate with one or more remote data processing devices such as the NOC 150, cloud services and/or enterprise server 170 as described above. Such programs may be may be configured to provide a workspace service that provides functions for accessing, creating, and editing workspace data objects as described above.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A portable computing device, comprising:
a touch-screen display configured to receive touch-screen input;
a memory comprising computer-executable software; and
a processor in data communication with the touch-screen display and the memory,
wherein the processor is configured to execute the computer-executable software and receive data relating to touch-screen input from the touch-screen display in order to cause the portable computing device to:
display, on the touch-screen display, a first user interface configuration, the first user interface configuration being displayed by a first application associated with a first workspace service, the first user interface configuration including a first area comprising a first selectable element and a second area comprising a second selectable element, wherein the first selectable element corresponds to a first workspace data object associated with the first workspace service provided by the first application and the second selectable element corresponds to a second workspace service provided by a second application, different from the first application;
receive, on the touch-screen display, a first touch-screen input corresponding to the selection of the first selectable element associated with the first application;
receive, on the touch-screen display, a second touch-screen input corresponding to the selection of the second selectable element associated with the second application, different from the first application;
display, on the touch-screen display, a second user interface configuration associated with the second workspace service provided by the second application, different from the first application in response to receiving the first touch-screen input and the second touch-screen input, the second user interface configuration including a third area and a fourth area, the third area of the second user interface configuration replacing the first area of the first user interface configuration and the fourth area of the second user interface configuration replacing the second area of the first user interface configuration;
display, on the touch-screen display, in the fourth area of the second user interface configuration, a third selectable element, wherein the third selectable element corresponds to a second workspace data object associated with the second workspace service provided by the second application;
receive, on the touch-screen display, a third touch-screen input corresponding to the selection of the third selectable element associated with the second application; and
populate the second workspace data object with data from the first workspace data object in response to receiving the first touch-screen input, the second touch-screen input, and the third touch-screen input.

2. The portable computing device according to claim 1, wherein the first workspace service is one of an email application, a contact application, a calendar application, a task application, a document management application, a messaging application, or a social network application.

3. The portable computing device according to claim 2, wherein the second workspace service is one of an email application, a contact application, a calendar application, a task application, a document management application, a messaging application, or a social network application.

4. The portable computing device according to claim 1, wherein the processor is further configured to cause the portable computing device to: display on the touch-screen display, a workspace service editor user interface associated with the second workspace service and configured to edit the second workspace data object.

5. The portable computing device according to claim 1, wherein the data from the first workspace data object comprises at least a first workspace data characteristic configured to populate a second workspace data characteristic associated with the second workspace data object.

6. The portable computing device according to claim 1, wherein one or more of the first, second or third touch-screen input comprises a movement input followed by a pause input.

7. The portable computing device according to claim 1, wherein the first, second, and third touch screen inputs are continuous inputs on the touch-screen display.

8. The portable computing device according to claim 1, wherein the portable computing device further comprises: a network interface configured to:
   connect to a remote data processing device via a communications network; and
   transmit one or more of the first workspace data object or the second workspace data object to the remote data processing device via the communications network.

9. The portable computing device according to claim 1, wherein the portable computing device further comprises: a network interface configured to:
   connect to a remote data processing device via a communications network; and
   receive the one or more of first workspace data object or the second workspace data object from the remote data processing device via the communications network.

10. The portable computing device according to claim 1, wherein the processor is configured to execute the computer-executable software and receive data relating to touch-screen input from the touch-screen display in order to cause the portable computing device to:
   determine that the first touch-screen input corresponding to the selection of the first selectable element in the first area of the first user interface configuration is received before the second touch-screen input corresponding to the selection of the second selectable element in the second area of the first user interface configuration, the first selectable element corresponding to the first workspace data object associated with the first workspace service, the second selectable element corresponding to the second workspace service; and
   wherein displaying the second user interface configuration comprises displaying the second user interface configuration in response to determining that the first touch-screen input is received before the second touch-screen input, the second user interface configuration including the third area and the fourth area, the third area of the second user interface configuration replacing the first area of the first user interface configuration and the fourth area of the second user interface configuration replacing the second area of the first user interface configuration.

11. The portable computing device according to claim 1, wherein the processor is configured to execute the computer-executable software and receive data relating to touch-screen input from the touch-screen display in order to cause the portable computing device to:
   determine that the first touch-screen input corresponding to the selection of the first selectable element in the first area of the first user interface configuration is received after the second touch-screen input corresponding to the selection of the second selectable element in the second area of the first user interface configuration, the first selectable element corresponding to the first workspace data object associated with the first workspace service, the second selectable element corresponding to the second workspace service; and
   wherein displaying the second user interface configuration comprises displaying the second user interface configuration in response to determining that the first touch-screen input is received after the second touch-screen input, the second user interface configuration including the third area and the fourth area, the third area of the second user interface configuration being the same as the first area of the first user interface configuration and the fourth area of the second user interface configuration replacing the second area of the first user interface configuration.

12. A method for editing workspace data objects in a portable computing device comprising a touch-screen display, the method comprising:
   displaying, on the touch-screen display, a first user interface configuration, the first user interface configuration being displayed by a first application associated with a first workspace service, the first user interface configuration including a first area comprising a first selectable element and second area comprising a second selectable element, wherein the first selectable element corresponds to a first workspace data object associated with the first workspace service provided by the first application and the second selectable element corresponds to a second workspace service provided by a second application, different from the first application;
   receiving, on the touch-screen display, a first touch-screen input corresponding to the selection of the first selectable element associated with the first application;
   receiving, on the touch-screen display, a second touch-screen input corresponding to the selection of the second selectable element associated with the second application, different from the first application;
   displaying, on the touch-screen display, a second user interface configuration associated with the second workspace service provided by the second application, different from the first application in response to receiving the first touch-screen input and the second touch-screen input, the second user interface configuration including a third area and a fourth area, the third area of the second user interface configuration replacing the first area of the first user interface configuration and the fourth area of the second user interface configuration replacing the second area of the first user interface configuration;
   displaying, on the touch-screen display, in the fourth area of the second user interface configuration, a third selectable element, wherein the third selectable element corresponds to a second workspace data object associated with the second workspace service provided by the second application;
   receiving, on the touch-screen display, a third touch-screen input corresponding to the selection of the third selectable element associated with the second application; and
   populating the second workspace data object with data from the first workspace data object in response to receiving the first touch-screen input, the second touch-screen input, the third touch-screen input.

13. The method according to claim 12, wherein the first workspace service is one of an email application, a contact application, a calendar application, a task application, a document management application, a messaging application, or a social network application.

14. The method according to claim 13, wherein the second workspace service is one of an email application, a contact application, a calendar application, a task application, a document management application, a messaging application, or a social network application.

15. The method according to claim 12, further comprising:
   displaying, on the touch-screen display, a workspace service editor user interface associated with the second workspace service and configured to edit the second workspace data object.

16. The method according to claim 12, wherein populating the second workspace data object comprises transferring data between a first workspace data characteristic associated with the first workspace data object and a second workspace data characteristic associated with the second workspace data object.

17. A non-transitory, computer-readable medium comprising computer-executable instructions which, when executed by a portable computing device comprising a touch-screen display, cause the portable computing device to perform a method, the method comprising:

displaying, on the touch-screen display, first user interface configuration, the first user interface configuration being displayed by a first application associated with a first workspace service, the first user interface configuration including a first area comprising a first selectable element and a second area comprising a second selectable element, wherein the first selectable element corresponds to a first workspace data object associated with the first workspace service provided by the first application and the second selectable element corresponds to a second workspace service provided by a second application, different from the first application;

receiving, on the touch-screen display, a first touch-screen input corresponding to the selection of the first selectable element associated with the first application;

receiving, on the touch-screen display, a second touch-screen input corresponding to the selection of the second selectable element associated with the second application, different from the first application;

displaying, on the touch-screen display, a second user interface configuration associated with the second workspace service provided by the second application, different from the first application in response to receiving the first touch-screen input and the second touch-screen input, the second user interface configuration including a third area and a fourth area, the third area of the second user interface configuration replacing the first area of the first user interface configuration and the fourth area of the second user interface configuration replacing the second area of the first user interface configuration;

displaying, on the touch-screen display, in the fourth area of the second user interface configuration, a third selectable element, wherein the third selectable element corresponds to a second workspace data object associated with the second workspace service provided by the second application;

receiving, on the touch-screen display, a third touch-screen input corresponding to the selection of the third selectable element associated with the second application; and populating the second workspace data object with data from the first workspace data object in response to receiving the first touch-screen input, the second touch-screen input, and the third touch-screen input.

18. The non-transitory, computer-readable medium according to claim 17, wherein the first workspace service is one of an email application, a contact application, a calendar application, a task application, a document management application, a messaging application, or a social network application.

19. The non-transitory, computer-readable medium according to claim 18, wherein the second workspace service is one of an email application, a contact application, a calendar application, a task application, a document management application, a messaging application, or a social network application.

20. The non-transitory, computer-readable medium according to claim 17, wherein the method further comprises: displaying, on the touch-screen display, a workspace service editor user interface associated with the second workspace service and configured to edit the second workspace data object.

21. The non-transitory, computer-readable medium according to claim 17, wherein populating the second workspace data object comprises transferring data between a first workspace data characteristic associated with the first workspace data object and a second workspace data characteristic associated with the second workspace data object.

* * * * *